US011128582B2

(12) United States Patent
Chen et al.

(10) Patent No.: US 11,128,582 B2
(45) Date of Patent: Sep. 21, 2021

(54) EMOJI RECOMMENDATION METHOD AND APPARATUS

(71) Applicant: Tencent Technology (Shenzhen) Company Limited, Shenzhen (CN)

(72) Inventors: Kaibin Chen, Shenzhen (CN); Lin Li, Shenzhen (CN); Linping Tang, Shenzhen (CN); Changpeng Pan, Shenzhen (CN); Dong Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 515 days.

(21) Appl. No.: 15/974,524

(22) Filed: May 8, 2018

(65) Prior Publication Data
US 2018/0255009 A1    Sep. 6, 2018

Related U.S. Application Data

(63) Continuation-in-part of application No. PCT/CN2017/081333, filed on Apr. 21, 2017.

(30) Foreign Application Priority Data

Apr. 29, 2016  (CN) .......................... 201610286192.6

(51) Int. Cl.
*H04L 12/58*  (2006.01)
*G06F 16/00*  (2019.01)
(Continued)

(52) U.S. Cl.
CPC ............ *H04L 51/046* (2013.01); *G06F 16/00* (2019.01); *G06Q 50/01* (2013.01); *H04L 51/22* (2013.01);
(Continued)

(58) Field of Classification Search
CPC ....... H04L 51/046; H04L 51/22; H04L 51/32; H04L 67/22; H04L 51/04; G06F 16/00;
(Continued)

(56) References Cited

U.S. PATENT DOCUMENTS 9,363,570 B2 * 6/2016 Cho .................... H04N 21/4826
9,658,738 B1 * 5/2017 Park ...................... G06F 3/0481
(Continued)

FOREIGN PATENT DOCUMENTS

CN    103699547 A    4/2014
CN    102265586 B    7/2014
(Continued)

OTHER PUBLICATIONS

Tencent Technology, ISR, PCT/CN2017/081333, Jul. 27, 2017, 2 pgs.
(Continued)

*Primary Examiner* — Mehmet Yesildag
*Assistant Examiner* — Shaun D Sensenig
(74) *Attorney, Agent, or Firm* — Morgan, Lewis & Bockius LLP

(57) ABSTRACT

This application discloses an emoji recommendation method and apparatus. The method includes: displaying a first user interface of a social network client application; detecting occurrence of a trigger event that corresponds to a preset condition for triggering delivery of an emoji recommendation from the social network server to a first user; retrieving one or more emoji recommendations from the social network server, wherein the one or more emoji recommendations are selected from an emoji library for the first user in accordance with social behavior information of the first user; and displaying the one or more emoji recommendations on the first user interface, including displaying one or more editing controls to adjust one or more parameters for cal-
(Continued)

culating a correlation degree of the user and a respective emoji based on one or more attributes of the one or more emoji recommendations retrieved from the social network server.

14 Claims, 7 Drawing Sheets

(51) Int. Cl.
*G06Q 50/00* (2012.01)
*H04L 29/08* (2006.01)

(52) U.S. Cl.
CPC .............. *H04L 51/32* (2013.01); *H04L 67/22* (2013.01); *H04L 51/04* (2013.01)

(58) Field of Classification Search
CPC .............. G06F 16/9535; G06F 16/2457; G06F 3/04817; G06Q 50/01
See application file for complete search history.

(56) References Cited

U.S. PATENT DOCUMENTS

| | | | | |
|---|---|---|---|---|
| 2004/0068552 A1* | 4/2004 | Kotz | .................. | H04L 67/2842 709/218 |
| 2007/0106672 A1* | 5/2007 | Sighart | .............. | G06F 16/9535 |
| 2007/0143281 A1* | 6/2007 | Smirin | ................... | G06Q 30/02 |
| 2011/0113051 A1* | 5/2011 | Lindahl | ................. | G06F 16/632 707/758 |
| 2011/0252121 A1* | 10/2011 | Borgs | .................... | G06Q 10/10 709/223 |
| 2013/0006817 A1* | 1/2013 | Weber | ................... | G06Q 50/01 705/27.1 |
| 2015/0334067 A1* | 11/2015 | Zonka | .................... | H04L 51/02 715/752 |
| 2016/0210117 A1* | 7/2016 | Kim | ........................ | G06F 40/30 |
| 2018/0373683 A1* | 12/2018 | Hullette | ................ | G06F 40/134 |

FOREIGN PATENT DOCUMENTS

| | | |
|---|---|---|
| CN | 104156392 A | 11/2014 |
| CN | 104394057 A | 3/2015 |
| CN | 105975563 A | 9/2016 |
| JP | 2006309660 A | 11/2006 |
| JP | 2015032254 A | 2/2015 |
| WO | WO 2016007122 A1 | 1/2016 |

OTHER PUBLICATIONS

Tencent Technology, Written Opinion, PCT/CN2017/081333, dated Jul. 27, 2017, 5 pgs.
Tencent Technology, IPRP, PCT/CN2017/081333, Oct. 30, 2018, 6 pgs.

* cited by examiner

EMOJI RECOMMENDATION METHOD AND APPARATUS

RELATED APPLICATION

This application is a continuation-in-part of PCT application No. PCT/CN2017/081333, entitled "EMOJI RECOMMENDATION METHOD AND APPARATUS", filed Apr. 21, 2017, which claims priority to Chinese Patent Application No. 201610286192.6, filed with the Chinese Patent Office Apr. 29, 2016, and entitled "EMOJI RECOMMENDATION METHOD AND APPARATUS", all of which are incorporated by reference in their entirety.

FIELD OF THE TECHNOLOGY

The present disclosure relates to the field of Internet technologies, and in particular, to an emoji recommendation method and apparatus.

BACKGROUND OF THE DISCLOSURE

As an application that is most frequently used in an intelligent device, a social networking application client facilitates a user chatting with a friend.

When using the social networking application client to chat with the friend, the user not only may send text information to the friend, but also may select and send a stored emoji by using an emoji panel provided by the social networking application client. To enrich emojis that may be sent the user, the emoji panel provided by the social networking application client includes an emoji shop portal. The user may access a corresponding emoji shop page through the emoji shop portal. Emojis in the emoji shop page are sorted according to downloads or release time, to facilitate the user selecting and downloading an emoji.

Because different users have different preferences for the emojis, and the emojis are sorted according to the downloads or the release time of the emojis, the user can select a favorite emoji after browsing a large quantity of emojis. Consequently, the efficiency that the user adds the emoji is relatively low.

SUMMARY

To resolve a problem that the selection efficiency of the user is relatively low because emojis are sorted according to downloads or release time of the emojis and the user can select a favorite emoji after browsing a large quantity of emojis, embodiments of the presently disclosed technology provide an emoji recommendation method and apparatus. The technical solutions are as follows:

According to some embodiments of the presently disclosed technology, an emoji recommendation method is provided, the method includes: displaying a first user interface of a social network client application, wherein the social network client application is configured to communicate with a social network server providing a social networking platform, and wherein the social network client application corresponds to a first user of the social networking platform; while displaying the first user interface of the social network client application, detecting occurrence of a trigger event that corresponds to a preset condition for triggering delivery of an emoji recommendation from the social network server to the first user; in response to detecting the occurrence of the trigger event, retrieving one or more emoji recommendations from the social network server, wherein the one or more emoji recommendations are selected from an emoji library for the first user in accordance with social behavior information of the first user, including one or more social relationship chains of the user on the social network and emoji usage information of the user on the social network, the social relationship chains being used for indicating one or more associated users having respective preset social relationships with the user on the social network, and the emoji usage information being used for indicating respective usage behavior of the user to one or more emojis; and displaying the one or more emoji recommendations on the first user interface, including displaying one or more editing controls to adjust one or more parameters for calculating a correlation degree of the user and a respective emoji based on one or more attributes of the one or more emoji recommendations retrieved from the social network server.

According to some embodiments of the presently disclosed technology, an emoji recommendation method is provided, the method including:

obtaining social behavior information of a user, the social behavior information including one or more social relationship chains of the user on a social network and emoji usage information of the user on the social network, the social relationship chains being used for indicating one or more associated users having respective preset social relationships with the user on the social network, and the emoji usage information being used for indicating respective usage behavior of the user to one or more emojis;

calculating a respective correlation degree between the user and each emoji of a plurality of emojis in an emoji library according to the social behavior information; and sending one or more recommended emojis to a social networking application client corresponding to the user according to the respective correlation degrees.

According to a second aspect of the embodiments of the presently disclosed technology, an emoji recommendation apparatus is provided, the apparatus including a processor and a memory, the memory storing instructions that can be executed by the processor, and when executing the instructions, the processor being configured to perform the methods described herein.

BRIEF DESCRIPTION OF THE DRAWINGS

To describe the technical solutions in the embodiments of the presently disclosed technology more clearly, the following briefly describes the accompanying drawings required for describing the embodiments. Apparently, the accompanying drawings in the following description show merely some embodiments of the presently disclosed technology, and a person of ordinary skill in the art may still derive other drawings from these accompanying drawings without creative efforts.

DESCRIPTION OF EMBODIMENTS

Figures 1, 2:
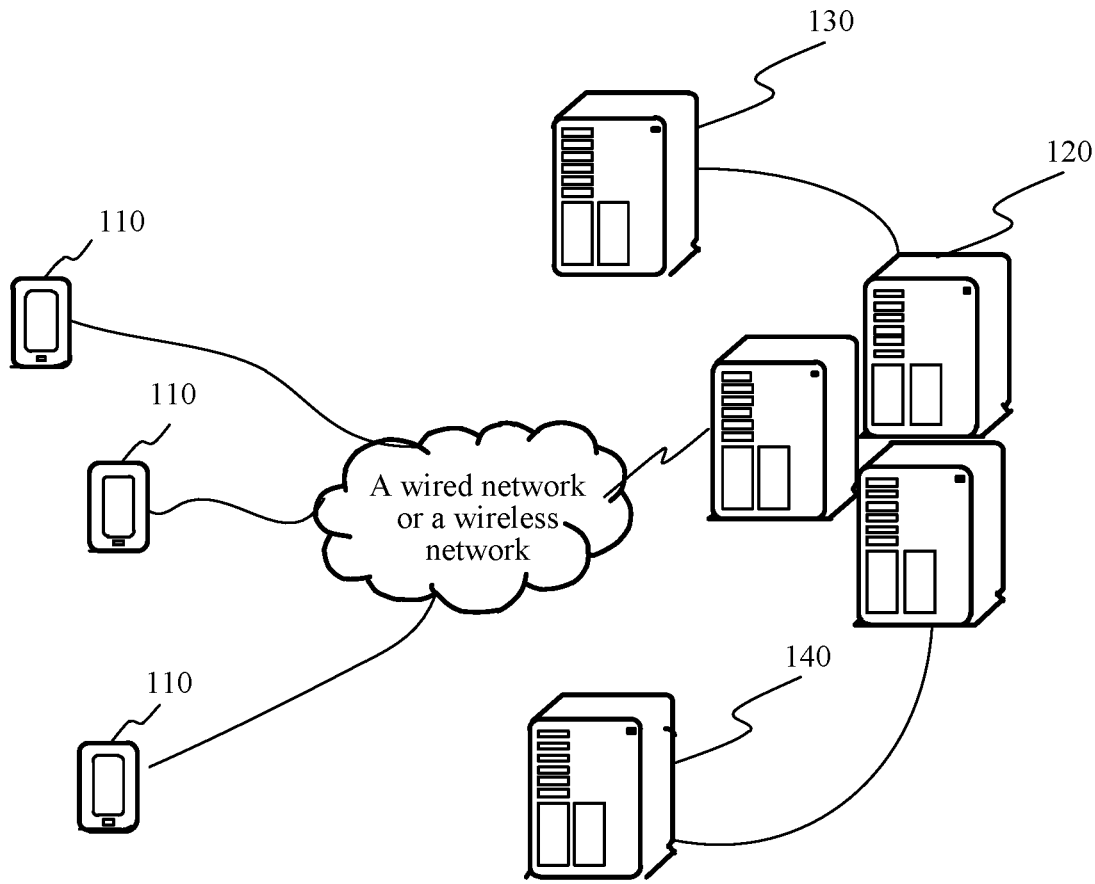
FIG. 1 is a schematic diagram of an implementation environment according to an embodiment of the presently disclosed technology.
FIG. 2 is a flowchart of an emoji recommendation method according to an embodiment of the presently disclosed technology.

To make the objectives, technical solutions, and advantages of the presently disclosed technology clearer, the following further describes implementations of the presently disclosed technology in detail with reference to the accompanying drawings.

To facilitate understanding, terms in embodiments of the presently disclosed technology are explained below.

A social networking application client is a social networking application program installed in a user terminal. The social networking application client usually has an instant messaging function. For example, the social networking application client may be an instant messaging program, a voice communications tool, a group voice tool, a rich-media social tool, a game platform, a microblog, or the like. When using the social networking application client, a user needs to perform login by using an account that is registered in advance. After completing the login, the user may chat with an associated user having a preset social relationship by using the social networking application client. The preset social relationship includes at least one of a friendship, a mutual following relationship, or a same group relationship.

A social relationship chain is a relationship chain established between users having the preset social relationship. In the embodiments of the presently disclosed technology, the social relationship chain particularly refers to a social relationship chain between users in a social networking application. In some embodiments, a social relationship chain includes a sequence of social network relationships that link a first user to a second user through social network relationships between a plurality of intermediate users between the first and second users (e.g., "six-degree of separations" type of relationship between first and second users, or multiple consecutive direct chain link type of relationships between first and second users).

Emoji usage information is information generated when the user uses an emoji in the social networking application client. The emoji usage information specifically includes a use manner, sending times, an emoji identifier, and the like. The use manner includes at least one of sending an emoji, collecting an emoji, or downloading an emoji.

A social intimacy degree is used for indicating an intimacy degree between the users having the preset social relationship in the social networking application. The social intimacy degree may be obtained by means of calculation according to a duration of a social relationship established between the users and/or a chatting frequency within a preset period of time.

An emoji weight value is used for indicating a degree of using the emoji by the user. The emoji weight value may be obtained by means of calculation according to the use manner and/or the sending times in the emoji usage information. For example, different (emoji) use manners correspond to different emoji weight values. For another example, the (emoji) sending times is proportional to the emoji weight value.

Referring to FIG. 1, FIG. 1 is a schematic diagram of an implementation environment according to an embodiment of the presently disclosed technology. The implementation environment includes at least one user terminal 110 and an emoji recommendation server 120.

The user terminal 110 is an electronic device in which a social networking application client runs. The electronic device may be a smartphone, a tablet computer, an MP3 player (Moving Picture Experts Group Audio Layer III), an MP4 (Moving Picture Experts Group Audio Layer IV) player, a laptop portable computer (a camera, or a video camera), or the like. Each user logs in to the social networking application client by using an account of the user, and may chat with an associated user having a preset social relationship by using the social networking application client.

The at least one user terminal 110 is connected to the emoji recommendation server 120 by using a wired or wireless network.

The emoji recommendation server 120 is a background server of the user terminal 110, and is configured to recommend an emoji to a social networking application client in each user terminal. The emoji recommendation server 120 is at least one server, a server cluster, a distributed server platform, a cloud computing center, or a combination of several server clusters. An emoji recommendation method provided in each embodiment of the presently disclosed technology is applied to the emoji recommendation server 120.

In another possible implementation, the implementation environment may further include a social relationship server 130 and a chatting records storage server 140. When emoji recommendation needs to be performed, the emoji recommendation server 120 may obtain a social relationship chain of each user from the social relationship server 130, and obtain emoji usage information of each user from the chatting records storage server 140.

Referring to FIG. 2, FIG. 2 is a flowchart of an emoji recommendation method according to an embodiment of the presently disclosed technology. This embodiment is described by using an example in which the emoji recommendation method is applied to the emoji recommendation server 120 in FIG. 1. The method includes the following steps:

Step 202: Obtain social behavior information of a user, the social behavior information including one or more social relationship chains of the user on the social network and emoji usage information of the user, the social relationship chains being used for indicating one or more associated users having respective preset social relationships with the user on the social network, and the emoji usage information being used for indicating a respective usage behavior of the user to the one or more emojis.

Step 204: Calculate a respective correlation degree between the user and each emoji of a plurality of emojis in an emoji library according to the social behavior information.

The emoji recommendation server calculates the correlation degree between the user and each emoji in the emoji library according to the obtained social behavior information. In a possible implementation, when the social relationship chain of the user indicates that the quantity of associated users having the preset social relationship with the user is less than a threshold, the emoji recommendation server calculates the correlation degree between the user and each emoji in the emoji library according to the emoji usage information of the user. In another possible implementation, when the emoji usage information of the user indicates that the quantity of emojis used by the user is less than a threshold, the emoji recommendation server calculates the correlation degree between the user and each emoji in the emoji library according to the social relationship chain of the user.

Step 206: Send one or more recommended emojis to the social networking application client corresponding to the user according to the respective correlation degrees that have been calculated.

After obtaining the correlation degree between the user and each emoji in the emoji library by means of calculation, the emoji recommendation server may determine that an emoji whose correlation degree is greater than a preset correlation degree threshold is the recommended emoji; or may determine that emojis whose correlation degrees ranked first n are the recommended emojis, and send the recommended emojis to the social networking application client corresponding to the user, so that the social networking application client may display the recommended emojis.

Compared with the existing technology in which emojis are sorted according to downloads or release time, when emoji recommendation is performed by using the emoji recommendation method provided in this embodiment, because the recommended emoji is determined according to the social behavior information of the user, the recommended emoji more meets an emoji preference of the user, so that the user is prevented from searching a large quantity of emojis for a favorite emoji, thereby improving the efficiency of adding an emoji by the user.

In conclusion, according to the emoji recommendation method provided in this embodiment, the social behavior information of the user is obtained, the correlation degree between the user and each emoji in the emoji library is calculated according to the social relationship chain and/or the emoji usage information that are included in the social behavior information, and emoji recommendation is performed based on the correlation degree, to resolve a problem that because emojis are sorted according to the downloads or release time of the emojis, and the user can select the favorite emoji after browsing the large quantity of emojis, the selection efficiency of the user is relatively low; and to perform the emoji recommendation based on the social relationship chain of the user and/or an emoji use situation of the user, so that a matching degree of the emoji recommended to the user with the user is relatively high, thereby improving the efficiency of adding the emoji by the user.

When the emoji usage information of the user indicates that the quantity of emojis used by the user is less than the threshold (for example, 5), a matching degree of the recommended emoji with the user may be affected when the emoji recommendation is performed according to the emoji usage information of the user. Therefore, when the emoji usage information of the user indicates that the quantity of emojis used by the user is less than the threshold, the emoji recommendation server calculates the correlation degree between the user and each emoji in the emoji library according to the social relationship chain of the user. A schematic embodiment is described below.

Figure 3A:
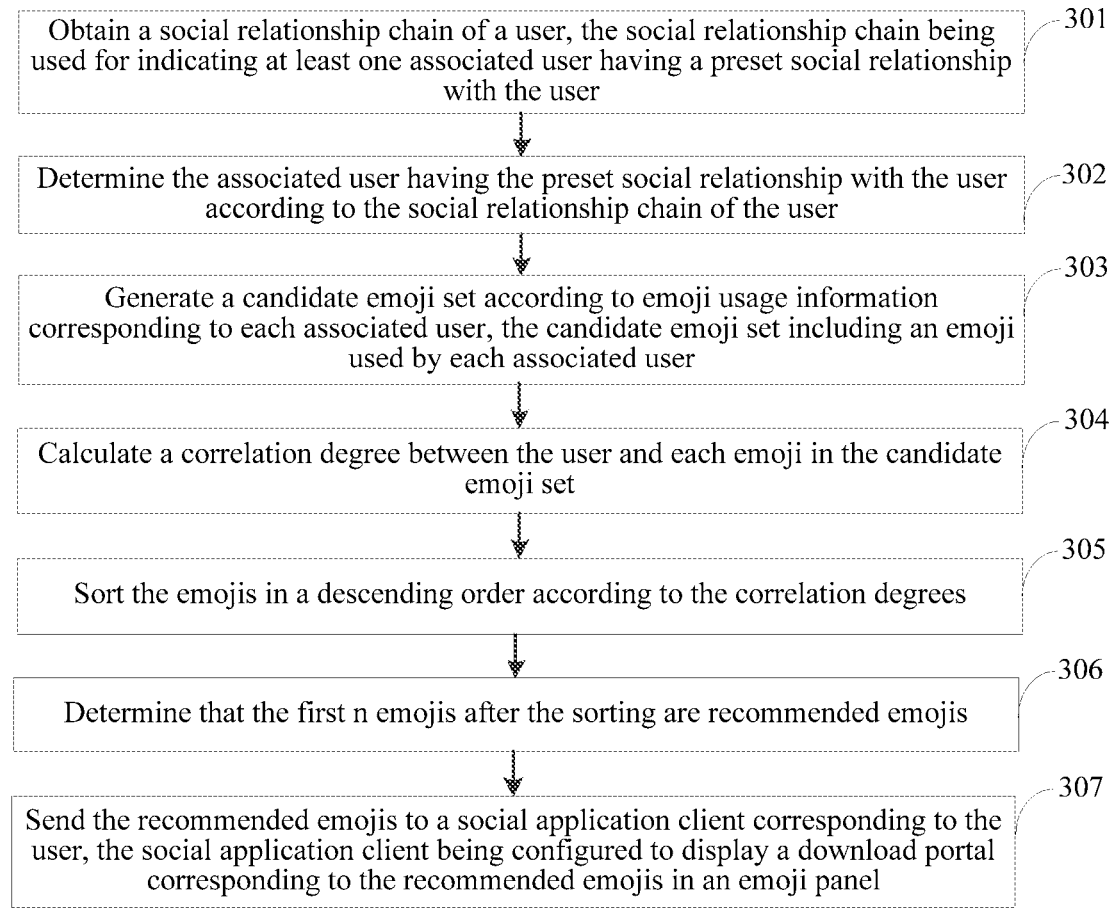
FIG. 3A is a flowchart of an emoji recommendation method according to another embodiment of the presently disclosed technology.

Referring to FIG. 3A, FIG. 3A is a flowchart of an emoji recommendation method according to another embodiment of the presently disclosed technology. This embodiment is described by using an example in which the emoji recommendation method is applied to the emoji recommendation server 120 in FIG. 1. The method includes the following steps:

Step 301: Obtain a social relationship chain of a user, the social relationship chain being used for indicating at least one associated user having a preset social relationship with the user.

In a possible implementation, when needing to perform emoji recommendation, the emoji recommendation server may obtain the social relationship chain of the user from a social relationship server that is configured to maintain a social relationship between users. The social relationship chain information includes each associated user having the preset social relationship with the user. For ease of description, this embodiment is described by using an example in which the preset social relationship is a friendship, and the associated user is a friend user.

Schematically, the social relationship chain of each user that is obtained by the server is shown in Table 1.

TABLE 1

| User identifier | Social relationship chain |
| --- | --- |
| Adam | Alice, Bob, Lucy, Mike, John, and Grecy |
| Alice | Adam, Mike, Johnson, and Michael |
| . . . | . . . |
| Zark | Michael, Lily, Kobe, and James |

It should be noted that the emoji recommendation server may also obtain a friendship chain of the user in another manner. The manner in which the emoji recommendation server obtains the social relationship chain is not limited in this embodiment of the presently disclosed technology.

Step 302: Determine the associated users having the respective preset social relationships with the user according to the social relationship chains of the user.

The emoji recommendation server determines the associated user corresponding to each user according to the obtained social relationship chain. For example, the social relationship chain of each user that is obtained by the emoji recommendation server is shown in Table 1, to determine that associated users having the preset social relationship with user Adam include Alice, Bob, Lucy, Mike, John, and Grecy, and determine that associated users having the preset social relationship with user Zark include Michael, Lily, Kobe, and James.

Step 303: Generate a candidate emoji set according to respective emoji usage information corresponding to each of the associated users, where the candidate emoji set includes at least one emoji used by an associated user.

Because the quantity of emojis in an emoji library is large, a large quantity of calculation resources needs to be consumed when a correlation degree between the user and each emoji in the emoji library is calculated. However, the users having the preset social relationship usually have a similar preference. Correspondingly, emojis that are frequently used by the associated user likely meet the user preference.

Therefore, after determining the associated user corresponding to the user, the emoji recommendation server obtains the emoji usage information of each associated user, further determines the emoji used by each associated user according to the emoji usage information, to generate a corresponding candidate emoji set, and selects an emoji having a relatively high correlation degree with the user from the candidate emoji set as a recommended emoji, thereby reducing a calculation amount. The emoji usage information of each associated user may be obtained from the chatting records storage sever in FIG. 1, which is not limited in this embodiment of the presently disclosed technology.

The emoji usage information of each associated user includes information such as a use manner, sending times, and emoji identifiers. When generating the candidate emoji set according to the emoji usage information, that is, the emoji recommendation server performs inductive statistics on the emoji identifiers included in the emoji usage information.

For example, the social relationship chain of the user Zark that is obtained by the emoji recommendation server include the associated users Michael, Lily, Kobe, and James. Moreover, the emoji usage information corresponding to Michael includes emoji identifiers emoji001, emoji002, and emoji004; the emoji usage information corresponding to Lily includes emoji identifiers emoji001, emoji004, and emoji008; the emoji usage information corresponding to Kobe includes emoji identifiers emoji03, emoji007, and emoji012; and the emoji usage information corresponding to James includes emoji identifiers emoji001 and emoji002. The emoji recommendation server determines that a set of the obtained emoji identifiers is the candidate emoji set. That is, the candidate emoji set includes emoji001, emoji002, emoji003, emoji004, emoji007, emoji008, and emoji012.

Step 304: Calculate the respective correlation degree between the user and each emoji in the candidate emoji set.

After obtaining the candidate emoji set, the emoji recommendation server further calculates the correlation degree between the user and each emoji in the candidate emoji set.

Figure 3B:
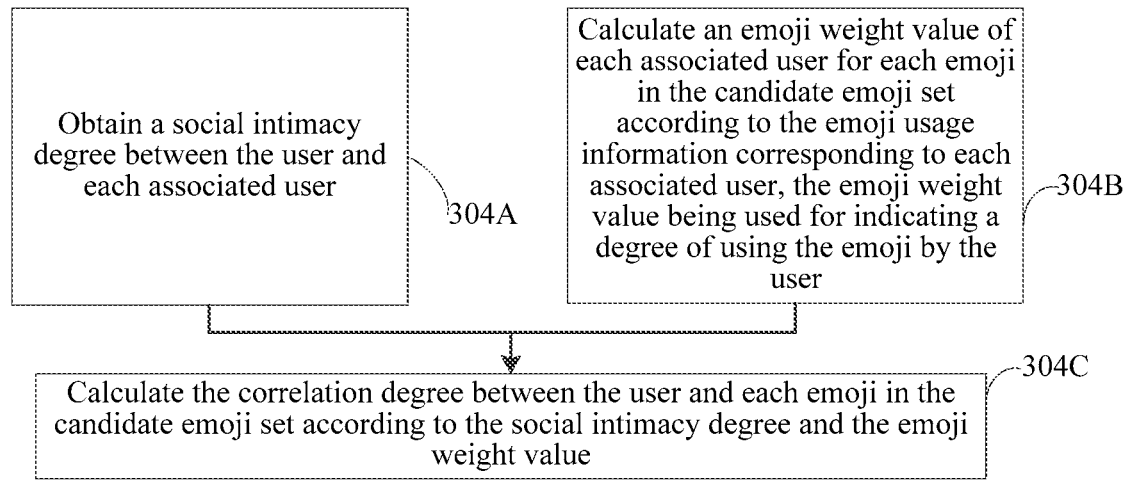
FIG. 3B is a flowchart of a calculation process of a correlation degree involved in the emoji recommendation method shown in FIG. 3A.

For two users (the user and the associated user) having the preset social relationship, as their social intimacy degree is higher, similarity degrees of their preferences for emojis are also higher. Correspondingly, the correlation degree between an emoji used by the associated user and the user is also higher. Meanwhile, a preference of the associated user for an emoji is higher (that is, an emoji weight value for the emoji is higher). Correspondingly, the correlation degree between the user and the emoji is also higher. Therefore, when calculating the correlation degree between the user and each emoji in the candidate emoji set, the emoji recommendation server needs to integrate a social intimacy degree between the user and each associated user and an emoji weight value of each associated user for each emoji (in the candidate emoji set). In a possible implementation, as shown in FIG. 3B, the step may include the following steps:

Step 304A: Obtain a respective social intimacy degree between the user and each of the associated users.

The emoji recommendation server may calculate the social intimacy degree between the user and each associated user according to a duration of establishing a social relationship between the user and each associated user and/or according to a frequency of chatting between the user and each associated user within a preset period of time.

Schematically, a corresponding relationship between the duration of establishing the social relationship between the users and the social intimacy degree may be shown in Table 2.

TABLE 2

| Duration of establishing social relationship | Social intimacy degree |
|---|---|
| 1 to 30 days | 20 |
| 30 to 150 days | 50 |
| More than 150 days | 80 |

Schematically, a corresponding relationship between the frequency of chatting between the users and the social intimacy degree may be shown in Table 3.

TABLE 3

| Frequency of chatting | Social intimacy degree |
|---|---|
| 0 times/month to twice/month | 10 |
| twice/month to eight times/month | 40 |
| More than eight times/month | 80 |

Step 304B: Calculate a respective emoji weight value of each of the associated users for each emoji in the candidate emoji set according to the respective emoji usage information corresponding to each of the associated users, where the respective emoji weight value is used for indicating a degree of usage of the emoji by the associated user.

While obtaining the social intimacy degree between the user and each associated user, the emoji recommendation server may calculate the emoji weight value of each associated user for each emoji in the candidate emoji set according to the information such as the use manner and the sending times included in the emoji usage information corresponding to each associated user.

In a possible implementation, for different use manners, emoji weight values corresponding to the different use manners are preset in the emoji recommendation server.

For example, the emoji weight value corresponding to sending an emoji is 1, the emoji weight value corresponding to sending an emoji is 0, the emoji weight value corresponding to downloading an emoji is 1.2, and the emoji weight value corresponding to collecting an emoji is 1.5. When the emoji usage information corresponding to the associated user James indicates that James sends the emoji emoji001 and collects the emoji emoji002, and the candidate emoji set includes the emoji001, emoji002, emoji003, emoji004, emoji007, emoji008, and emoji012, the emoji weight value of the user James for the emoji001 is 1, the emoji weight value for the emoji002 is 1.5, the emoji weight value for the emoji003 is 0, the emoji weight value for the emoji004 is 0, the emoji weight value for the emoji007 is 0, the emoji weight value for the emoji008 is 0, and the emoji weight value for the emoji012 is 0.

In another possible implementation, the emoji weight value of the associated user for an emoji is proportional to times of sending the emoji. The emoji recommendation server calculates the emoji weight value of the associated user for the emoji according to the times of sending the emoji by the associated user.

It should be noted that the emoji recommendation server may alternatively calculate the emoji weight value of the associated user for each emoji in the candidate emoji set in another manner. This embodiment is schematically described only by using the foregoing two possible implementations, and this embodiment is not limited thereto.

Step 304C: Calculate the respective correlation degree between the user and each emoji in the candidate emoji set according to the respective social intimacy degrees and the respective emoji weight values for the associated users of the user.

The emoji recommendation server calculates the respective correlation degree between the user and each emoji in the candidate emoji set by integrating the social intimacy degree and the emoji weight value. In a possible implementation, the emoji recommendation server calculates the respective correlation degree between the user and each emoji in the candidate emoji set by substituting the respective social intimacy degrees and the respective emoji weight values into a first correlation degree calculation formula, where the first correlation degree calculation formula is $$Score_{u,e} = \sum_{f}^{FriendOf(u)} \text{Weight}(u, f) * UserEmojiInteract(f, e),$$

where $Score_{u,e}$ represents the correlation degree between a user u and an emoji e in the candidate emoji set;
FriendOf(u) represents a set of associated users having the preset social relationship with the user u;
Weight(u, f) represents the social intimacy degree between the user u and an associated user f; and
UserEmojiInteract(f, e) represents the emoji weight value of the associated user f for the emoji$^e$.

With reference to the foregoing embodiment, FriendOf (u) corresponding to the user Zark includes Michael, Lily, Kobe, and James; Weight(u, f) includes the social intimacy degree between Zark and Michael, the social intimacy degree between Zark and Lily, the social intimacy degree between Zark and Kobe, and the social intimacy degree between Zark and James; and UserEmojiInteract(f, e) includes the emoji weight value of Michael for each emoji (emoji001, emoji002, emoji003, emoji004, emoji007, emoji008, and emoji012) in the candidate emoji set, the emoji weight value of Lily for each emoji in the candidate emoji set, the emoji weight value of Kobe for each emoji in the candidate emoji set, and the emoji weight value of James for each emoji in the candidate emoji set.

Step 305: Sort the emojis in a descending order according to the respective correlation degrees of the emojis.

After obtaining the correlation degree between the user and each emoji in the candidate emoji set by means of calculation, the emoji recommendation server sorts each emoji in the candidate emoji set in a descending order according to the correlation degree. As a value of the correlation degree is larger, it indicates that the correlation degree between the user and the emoji is higher, and the possibility that the emoji meets the user preference is higher.

For example, by means of calculation, the emoji recommendation server obtains that the correlation degree between Zark and emoji001 is 85, the correlation degree between Zark and emoji002 is 76, the correlation degree between Zark and emoji003 is 30, the correlation degree between Zark and emoji004 is 50, the correlation degree between Zark and emoji007 is 15, the correlation degree between Zark and emoji008 is 21, and the correlation degree between Zark and emoji012 is 18. Sorted emojis are emoji001, emoji002, emoji004, emoji003, emoji008, emoji012, and emoji007.

Step 306: Determine that the first n emojis after the sorting are recommended emojis.

For example, the sorted emojis are emoji001, emoji002, emoji004, emoji003, emoji008, emoji012, and emoji007.

The emoji recommendation server determines that the first three emojis are the recommended emojis, that is, determines that the emoji001, emoji002, and emoji004 are the recommended emojis.

It should be noted that, in another possible implementation, the emoji recommendation server may alternatively determine that an emoji whose correlation degree is greater than a preset correlation degree threshold is the recommended emoji. This is not limited in this embodiment of the presently disclosed technology.

Step 307: Send the recommended emojis to a social networking application client corresponding to the user, where the social networking application client is configured to display a download portal corresponding to the recommended emojis in an emoji panel.

The emoji recommendation server sends the determined recommended emojis to the user. When the user uses the social networking application client and opens the emoji panel, the download portal corresponding to the recommended emojis is immediately displayed in the emoji panel. The user may view, by using the download portal, information about the recommended emojis and download the recommended emojis. To distinguish a downloaded emoji of the user and the recommended emojis, the download portal corresponding to the recommended emojis and the downloaded emoji use different display effects. For example, the download portal corresponding to the recommended emojis may use a gray background, a highlight background, or the like.

Figure 3C:
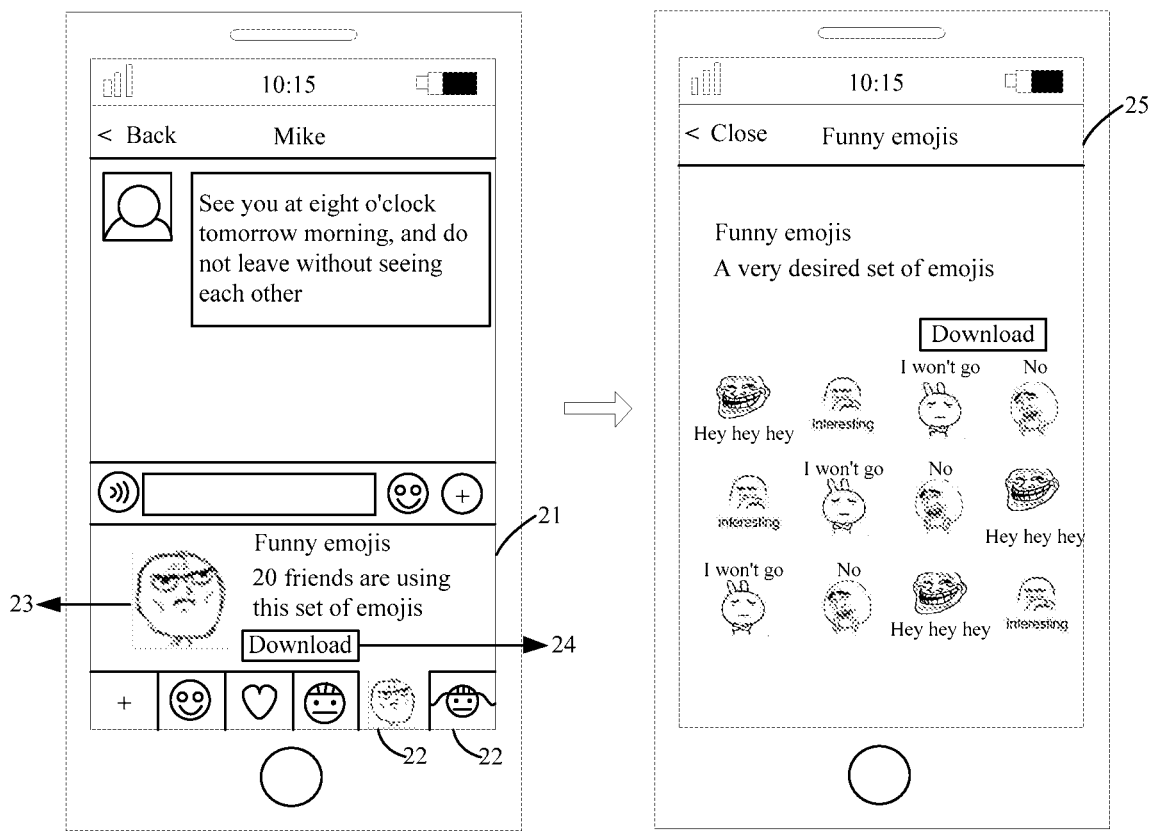
FIG. 3C is a schematic diagram of an interface of the emoji recommendation method shown in FIG. 3A.

As shown in FIG. 3C, when the user opens an emoji panel 21 of the social networking application client, a download portal 22 corresponding to the recommended emojis is immediately displayed in the emoji panel 21. When the user taps the download portal 22, related information 23 about the recommended emojis and a download control 24 are displayed in the emoji panel 21. When the user taps the related information 23, the social networking application client displays a details page 25 corresponding to the recommended emojis. The details page 25 includes detailed information about the recommended emojis. When the user taps the download control 24, the recommended emojis may be immediately downloaded.

It should be noted that, to ensure time validity of the recommended emojis, the emoji recommendation server may repeat step 301 to step 306 according to a preset time interval (for example, once/day), to update an emoji recommended to the user in real time.

When emoji recommendation is performed by using the emoji recommendation method provided in the foregoing embodiment, the emoji recommendation server performs the emoji recommendation for different users, and a matching degree of an emoji recommended to the user with the user preference is relatively high. Meanwhile, the emoji recommended by the emoji recommendation server to the user is directly displayed in the emoji panel, to facilitate the user directly downloading the emoji. Compared with accessing an emoji shop by using an emoji shop entry and browsing and downloading an emoji, the method facilitates the user rapidly downloading a favorite emoji, thereby improving the efficiency of downloading the emoji by the user.

In conclusion, according to the emoji recommendation method provided in this embodiment, the social behavior information of the user is obtained, the correlation degree between the user and each emoji in the emoji library is calculated according to the social relationship chain and/or the emoji usage information that are included in the social behavior information, and emoji recommendation is performed based on the correlation degree, to resolve a problem that because emojis are sorted according to the downloads or release time of the emojis, and the user can select the favorite emoji after browsing the large quantity of emojis, the selection efficiency of the user is relatively low; and to perform the emoji recommendation based on the social relationship chain of the user and/or an emoji use situation of the user, so that a matching degree of the emoji recommended to the user with the user is relatively high, thereby improving the efficiency of adding the emoji by the user.

In this embodiment, the emoji recommendation server determines the associated user having the preset social relationship with the user by using the social relationship chain of the user, and performs the emoji recommendation according to emoji usage of each associated user, so that the emoji recommended to the user more meets an emoji preference of the user. Meanwhile, compared with displaying a large quantity of emojis in the emoji shop, directly displaying the emoji recommended by the emoji recommendation server to the user in the emoji panel is more intuitive, and facilitates the user rapidly downloading the emoji, thereby improving the efficiency of downloading the emoji by the user.

In this embodiment, when calculating the correlation degree between the user and the emoji, the emoji recommendation server integrates the social intimacy degree between the user and the associated user and the emoji weight value of the associated user for the emoji, thereby ensuring the accuracy of the correlation degree that is obtained by means of calculation, and increasing the matching degree of the recommended emojis with the user preference.

To make the user learn of a recommendation policy by using which the emoji recommendation server performs the emoji recommendation, while sending the recommended emojis to the social networking application client corresponding to the user, the emoji recommendation server sends corresponding recommendation information to the social networking application client according to a calculation method of the correlation degree. In a possible implementation, after step 307, the method further includes the following step.

Step 308: Send corresponding recommendation information to the social networking application client corresponding to the user according to a calculation method of the correlation degree, where the social networking application client is configured to display the recommendation information when displaying the download portal corresponding to the recommended emojis in the emoji panel.

In a possible implementation, when calculating the correlation degree according to the social relationship chain of the user, after determining the recommended emojis, the emoji recommendation server further obtains, according to the emoji usage information of each associated user in the social relationship chain, the quantity of associated users using the recommended emojis, and send, to the social networking application client, recommendation information including the quantity of the users. For example, as shown in FIG. 3C, the recommendation information may be "20 friends are using this set of emoji", where 20 is the quantity of associated users using the recommended emojis. After receiving the recommendation information, the social networking application client displays the recommendation information while displaying the download portal corresponding to the recommended emojis.

When the social relationship chain of the user indicates that the quantity of the associated users corresponding to the user is less than a threshold (for example, 5), emoji recommendation performed according to emoji usage of the associated users can affect a matching degree of the recommended emojis with the user. Therefore, when the social relationship chain of the user indicates that the quantity of the associated users corresponding to the user is less than the threshold, the emoji recommendation server calculates the correlation degree between the user and each emoji in the emoji library according to the emoji usage information of the user. A schematic embodiment is described below.

Figure 4A:
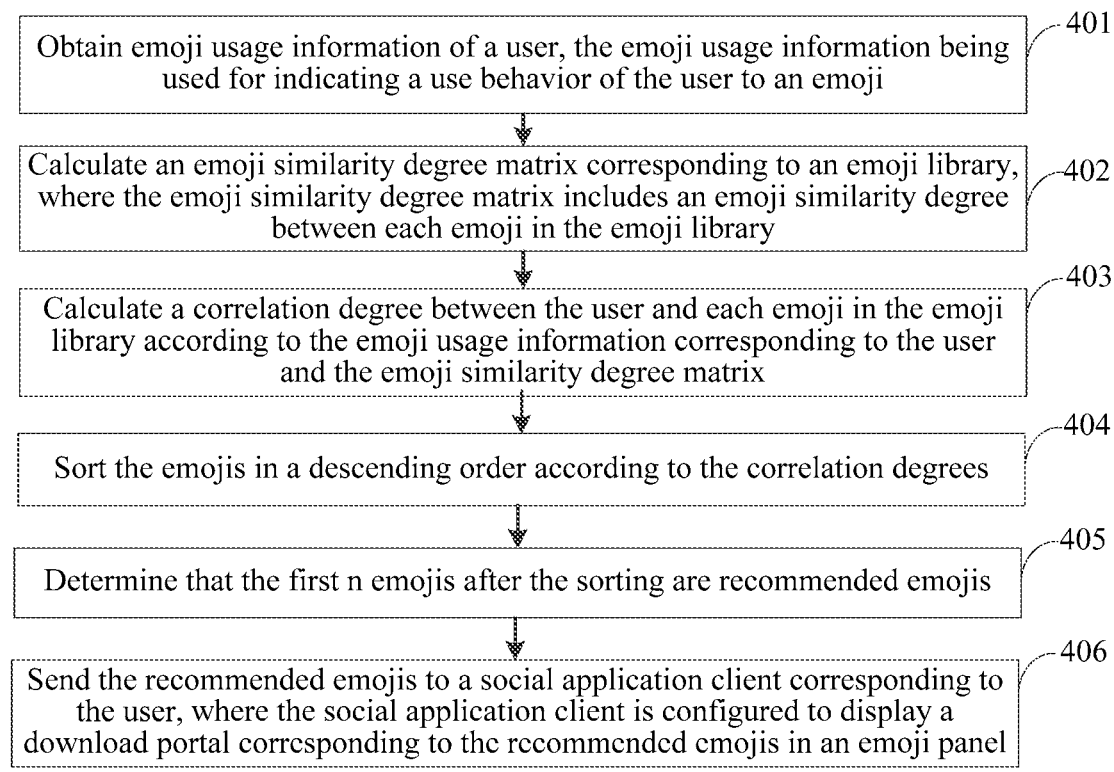
FIG. 4A is a flowchart of an emoji recommendation method according to still another embodiment of the presently disclosed technology.

Referring to FIG. 4A, FIG. 4A is a flowchart of an emoji recommendation method according to still another embodiment of the presently disclosed technology. This embodiment is described by using an example in which the emoji recommendation method is applied to the emoji recommendation server 120 in FIG. 1. The method includes the following steps:

Step 401: Obtain emoji usage information of a user, the emoji usage information being used for indicating a usage behavior of the user to an emoji.

In a possible implementation, when needing to perform emoji recommendation, the emoji recommendation server may obtain the emoji usage information of the user from a chatting records storage server configured to store chatting records between users.

In a possible implementation, the chatting records storage server stores the emoji usage information of each user by using a key-value storage format, where key is a user identifier of the user, and value is a combination of an emoji identifier and sending times. Schematically, the emoji usage information of the users is shown in Table 4.

TABLE 4

| Key | Value |
| --- | --- |
| Adam | emoji001-5, emoji002-7, and emoji007-3 |
| Alice | emoji003-5 and emoji012-7 |
| Zark | emoji001-3 and emoji002-10 |

In another possible implementation, the emoji usage information may also include a manner in which the user uses the emoji, for example, sending the emoji, downloading the emoji, collecting the emoji, and the like. This is not limited in this embodiment.

Step 402: Calculate an emoji similarity degree matrix corresponding to an emoji library, where the emoji similarity degree matrix includes a respective emoji similarity degree between each pair of emojis in the emoji library.

For all emojis in the emoji library, the emoji recommendation server calculates the similarity degree between each pair of emojis in the emoji library in advance, to obtain the emoji similarity degree matrix corresponding to the emoji library.

In a possible implementation, for an emoji α and an emoji β in the emoji library, an emoji similarity degree $Ma_{\alpha, \beta}$ between the emoji α and the emoji β is $$M_{\alpha,\beta} = \frac{1}{k_\alpha^{1-\lambda} k_\beta^\lambda} \sum_{j=1}^{u} \frac{a_{\alpha j} a_{\beta j}}{k_j},$$

where $k_\alpha$ represents the quantity of users sending the emoji α; $k_\beta$ represents the quantity of users sending the emoji β; u represents all users; $k_j$ represents the quantity of emojis sent by a user j; $a_{\alpha j}$ indicates whether the user j sends the emoji α, and if the user j sends the emoji α, $a_{αj}=1$ or if the user j does not send the emoji α, $a_{αj}=0$; $a_{βj}$ indicates whether the user j sends the emoji β, and if the user j sends the emoji β, $a_{βj}=1$, or if the user j does not send the emoji β, $a_{βj}=0$; and λ is a floating point number, where $0<λ<1$. λ is used for regulating the accuracy of the similarity degree calculation and a recommended emoji coverage. The recommended emoji coverage is used for indicating a ratio of an emoji that is finally recommended to the user accounting for the emoji library. As λ is smaller, the recommended emoji coverage is larger. Usually, a value of λ is 0.3.

It should be noted that the emoji recommendation server may alternatively calculate the similarity degree between each emoji in the emoji library in another possible manner. This embodiment is only described by using the foregoing method, but is not limited thereto.

Step 403: Calculate the respective correlation degree between the user and each emoji in the emoji library according to the emoji usage information corresponding to the user and the emoji similarity degree matrix.

For an emoji that is frequently used by the user, a preference of the user for another emoji having a relatively similarity degree with the emoji is usually also relatively high. Therefore, the emoji recommendation server may indicate the emoji that is frequently used by the user and the emoji similarity degree matrix according to the emoji usage information, to search the emoji library for an emoji having a relatively high emoji similarity degree with the emoji that is frequently used by the user, use the emoji as a recommended emoji, and recommends the emoji to the user.

Figure 4B:
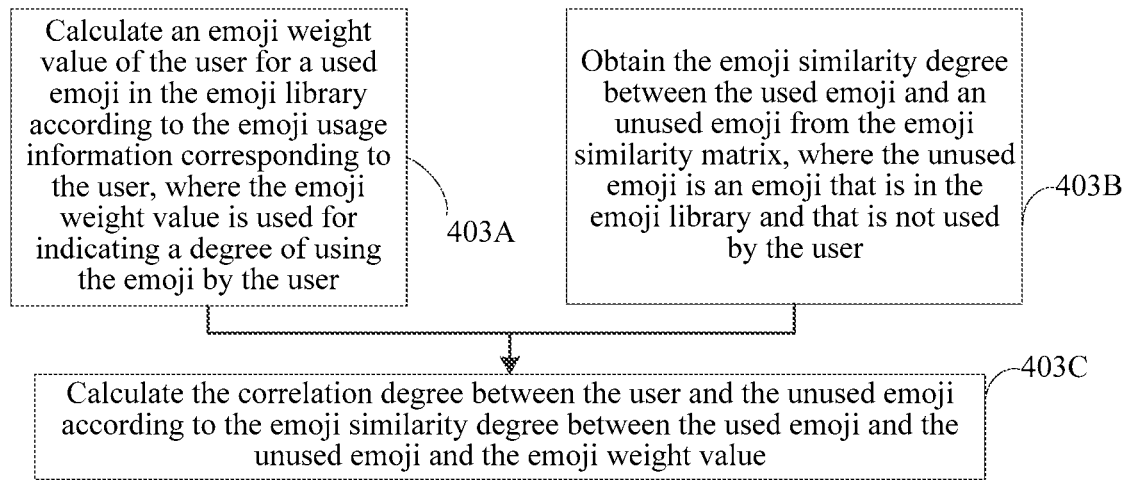
FIG. 4B is a flowchart of a calculation process of a correlation degree involved in the emoji recommendation method shown in FIG. 4A.

In a possible implementation, as shown in FIG. 4B, the step may include the following steps:

Step 403A: Calculate a respective emoji weight value of the user for a used emoji in the emoji library according to the emoji usage information corresponding to the user, where the respective emoji weight value is used for indicating a degree of using the emoji by the user.

Similar to step 304B, the emoji recommendation server may determine the used emoji of the user according to the emoji identifier included in the emoji usage information corresponding to the user, and calculate the emoji weight value of each used emoji of the user according to the information included in the emoji usage information, for example, the use manner and the sending times.

For example, for a user James, the emoji usage information of James indicates that the used emojis include the emoji001 and emoji002, the emoji weight value of James for the emoji001 is 1, and the emoji weight value for the emoji002 is 1.5.

Step 403B: Obtain the emoji similarity degree between the used emoji and an unused emoji from the emoji similarity degree matrix, where the unused emoji is an emoji that is in the emoji library and that is not used by the user.

Further, the emoji recommendation server obtains the emoji similarity degree between the used emoji and the unused emoji from the emoji similarity degree matrix that is obtained by means of calculation in step 402, where the unused emoji is the emoji that is not used by the user.

Step 403C: Calculate the respective correlation degree between the user and the unused emoji according to the emoji similarity degree between the used emoji and the unused emoji and the respective emoji weight value.

The emoji recommendation server calculates the correlation degree between the user and each unused emoji according to the emoji weight value of the user for the used emoji and the emoji similarity degree between the used emoji and the unused emoji. In a possible implementation, the emoji recommendation server may calculate the correlation degree between the user and the unused emoji by substituting the emoji similarity degree between the used emoji and the unused emoji and the emoji weight value into a second correlation degree calculation formula.

The second correlation degree calculation formula is $$Score_{u,e} = \sum_{se}^{SendEmojiList(u)} UserEmojiInteract(u, se) * M_{e,se},$$

where $Score_{u,e}$ represents the correlation degree between a user u and an unused emoji e;

SendEmojiList(u) represents a set of emojis used by the user u se represents a used emoji se;

UserEmojiInteract(u, se) represents the emoji weight value of the user u for the used emoji se; and $M_{e,se}$ represents the emoji similarity degree between the unused emoji e and the used emoji se.

Step 404: Sort the emojis in a descending order according to the respective correlation degrees of the emojis.

Step 405: Determine that the first n emojis after the sorting are recommended emojis.

Step 406: Send the recommended emojis to a social networking application client corresponding to the user, where the social networking application client is configured to display a download portal corresponding to the recommended emojis in an emoji panel.

Similar to step 305 to step 307, after obtaining the correlation degree between the user and the unused emoji by means of calculation, the emoji recommendation server sorts each unused emoji in the descending order according to the correlation degree, determines that the first n emojis having relatively high correlation degrees are the recommended emojis, and sends the recommended emojis to the user.

In conclusion, according to the emoji recommendation method provided in this embodiment, the social behavior information of the user is obtained, the correlation degree between the user and each emoji in the emoji library is calculated according to the social relationship chain and/or the emoji usage information that are included in the social behavior information, and emoji recommendation is performed based on the correlation degree, to resolve a problem that because emojis are sorted according to the downloads or release time of the emojis, and the user can select the favorite emoji after browsing the large quantity of emojis, the selection efficiency of the user is relatively low; and to perform the emoji recommendation based on the social relationship chain of the user and/or an emoji use situation of the user, so that a matching degree of the emoji recommended to the user with the user is relatively high, thereby improving the efficiency of adding the emoji by the user.

In this embodiment, the emoji recommendation server selects, according to emoji usage of the user and the similarity degree between each emoji in the emoji library, another emoji having a relatively high emoji similarity degree with the emoji that is frequently used by the user from the emoji library, and recommends the emoji to the user by using the emoji as the recommended emoji, so that the emoji recommended to the user is similar to an emoji preferred by the user, thereby increasing the accuracy of the emoji recommendation.

Similar to step 308, to make the user learn of a recommendation policy by using which the emoji recommendation server performs the emoji recommendation, while sending the recommended emojis to the social networking application client corresponding to the user, the emoji recommendation server sends corresponding recommendation information to the social networking application client according to a calculation manner of the correlation degree. In a possible implementation, after step 406, the method further includes the following step.

Step 407: Send corresponding recommendation information to the social networking application client corresponding to the user according to a calculation method of the correlation degree, where the social networking application client is configured to display the recommendation information when displaying the download portal corresponding to the recommended emojis in the emoji panel.

In a possible implementation, when calculating the correlation degree according to the emoji usage information of the user, the emoji recommendation server generates recommendation information by using a preset copywriting template after determining the recommended emoji, and sends the recommendation information to the social networking application client. For example, the recommendation information may be "A user also preferring a same type of emojis also prefers this set of emojis".

Figure 5:
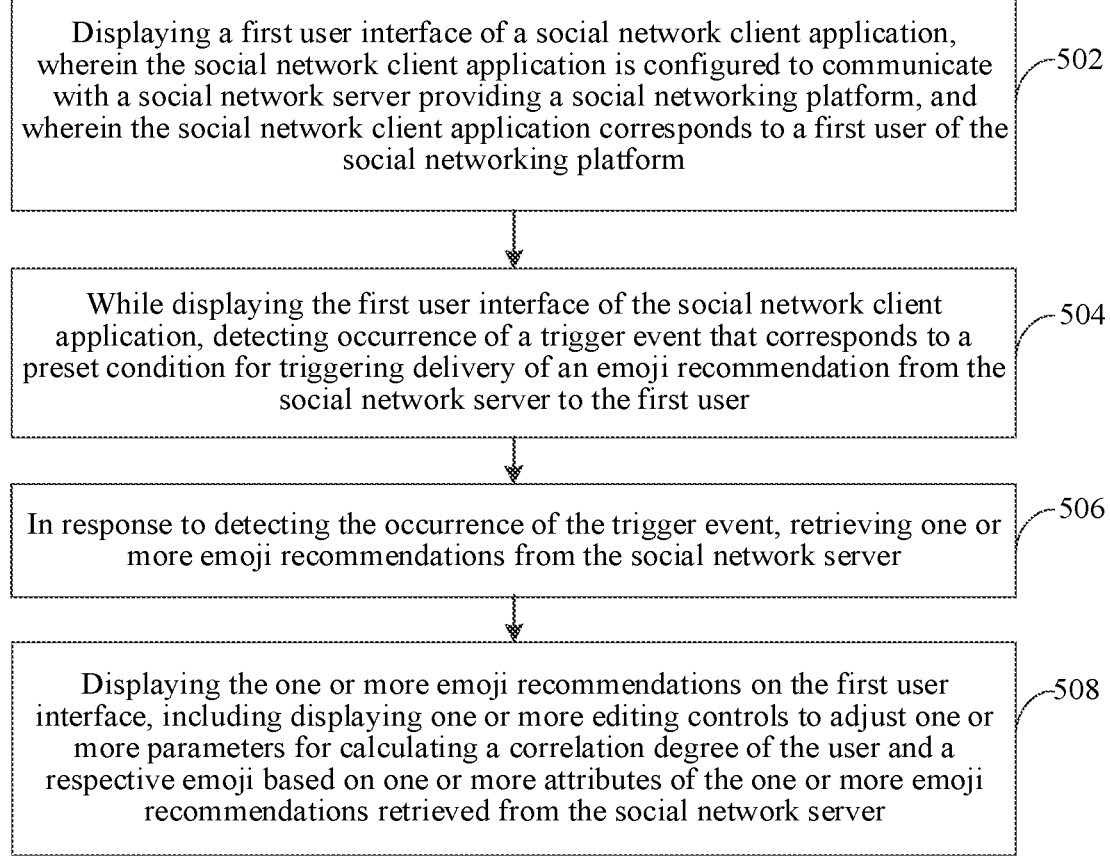
FIG. 5 is a flowchart of an emoji recommendation method according to an embodiment of the presently disclosed technology.

Based on the above, FIG. 5 is a flowchart of a method for recommending emojis. The method is performed at a social networking client device having one or more processors and memory, and in communication with the social networking server that performs the recommendation for the user of the social networking client device. The method includes the following steps: An emoji recommendation method, includes: displaying (502) a first user interface of a social network client application, wherein the social network client application is configured to communicate with a social network server providing a social networking platform, and wherein the social network client application corresponds to a first user of the social networking platform; while displaying the first user interface of the social network client application, detecting (504) occurrence of a trigger event that corresponds to a preset condition for triggering delivery of an emoji recommendation from the social network server to the first user; in response to detecting the occurrence of the trigger event, retrieving (506) one or more emoji recommendations from the social network server, wherein the one or more emoji recommendations are selected from an emoji library for the first user in accordance with social behavior information of the first user, including one or more social relationship chains of the user on the social network and emoji usage information of the user on the social network, the social relationship chains being used for indicating one or more associated users having respective preset social relationships with the user on the social network, and the emoji usage information being used for indicating respective usage behavior of the user to one or more emojis; and displaying (508) the one or more emoji recommendations on the first user interface, including displaying one or more editing controls to adjust one or more parameters for calculating a correlation degree of the user and a respective emoji based on one or more attributes of the one or more emoji recommendations retrieved from the social network server.

In some embodiments, detecting occurrence of a trigger event that corresponds to a preset condition for triggering delivery of an emoji recommendation from the social network server to the first user includes: while displaying a listing of currently downloaded emojis, detecting that there are less than a preset amount of emojis in the listing of currently downloaded emojis; and in accordance with detecting that there are less than a preset amount of emojis in the listing of currently downloaded emojis, sending a request to the social network server for an emoji recommendation.

In some embodiments, detecting occurrence of a trigger event that corresponds to a preset condition for triggering delivery of an emoji recommendation from the social network server to the first user includes: while displaying a chat session between the first user and at least a second user, detecting receipt of a message from the second user that includes at least one emoji that the user has not downloaded for the user's own use; and in accordance with detecting the receipt of a message from the second user that includes at least one emoji that the user has not downloaded for the user's own, sending a request to the social network server for an emoji recommendation.

In some embodiments, displaying the one or more editing controls to adjust one or more parameters for calculating a correlation degree of the user and a respective emoji based on one or more attributes of the one or more emoji recommendations retrieved from the social network server includes: identifying one or more relationship chains between the user and one or more associated users of the user that have been used to determine the correlation degree of the user and the respective emoji; and providing one or more controls to reduce or eliminate the effect of selected ones of the one or more relationship chains in the calculation of correlation degrees between the user and respective emojis for future emoji recommendations by the social network server. In some embodiments, the method includes receiving a first user input invoking the one or more controls to reduce or eliminate the effect of a first relationship chain of the one or more relationship chains in the calculation of correlation degrees between the user and respective emojis for future emoji recommendations by the social network server; and in response to receiving the first user input, sending an indicator of the first relationship chain to the social network server, wherein the social network server removes or reduce the effect of the first relationship chain in the calculation of correlation degrees between the user and respective emojis for future emoji recommendations for the first user. In some embodiments, the social network server reduces the effect of the first relationship chain by reducing a respective social intimacy degree between the first user and the user corresponding to the first relationship chain.

In some embodiments, displaying the one or more editing controls to adjust one or more parameters for calculating a correlation degree of the user and a respective emoji based on one or more attributes of the one or more emoji recommendations retrieved from the social network server includes: identifying one or more related emojis from the first user's emoji usage history that have been used to determine the correlation degree of the user and the respective emoji; and providing one or more controls to reduce or eliminate the effect of selected ones of the one or more related emojis in the calculation of correlation degrees between the user and respective emojis for future emoji recommendations by the social network server. In some embodiments, the method further includes: receiving a second user input invoking the one or more controls to reduce or eliminate the effect of a first related emoji among the one or more related emojis in the calculation of correlation degrees between the user and respective emojis for future emoji recommendations by the social network server; and in response to receiving the second user input, sending an indicator of the first related emoji among the one or more related emojis to the social network server, wherein the social network server removes or reduce the emoji similarity degree between the first related emoji and the respective emoji in the emoji similarity degree matrix, wherein the emoji similarity degree matrix is used in the calculation of correlation degrees between the user and respective emojis for future emoji recommendations for the first user.

Other details and features of the method are described above with respect to other embodiments. Actions performed on the server and actions performed by the client are optionally shifted to the other party (e.g., from client to server, or from server to client) in various embodiments, and are not repeated in the interest of brevity.

The following describes apparatus embodiments of the presently disclosed technology. For details not described in the apparatus embodiments in detail, refer to the foregoing one-to-one corresponding method embodiments.

In some embodiments, an emoji recommendation apparatus may be implemented, by means of hardware or a combination of hardware and software, as the entire or a part of the emoji recommendation server 120 in FIG. 1. The emoji recommendation apparatus includes modules configured to perform the methods described herein. For example, the apparatus includes:

an obtaining module, configured to obtain social behavior information of a user, the social behavior information including at least one of a social relationship chain of the user and emoji usage information of the user, the social relationship chain being used for indicating at least one associated user having a preset social relationship with the user, and the emoji usage information being used for indicating a usage behavior of the user to an emoji;

a calculation module, configured to calculate a correlation degree between the user and each emoji in an emoji library according to the social behavior information; and a sending module, configured to send a recommended emoji to a social networking application client corresponding to the user according to the correlation degree.

In conclusion, according to the emoji recommendation apparatus provided in this embodiment, the social behavior information of the user is obtained, the correlation degree between the user and each emoji in the emoji library is calculated according to the social relationship chain and/or the emoji usage information that are included in the social behavior information, and emoji recommendation is performed based on the correlation degree, to resolve a problem that because emojis are sorted according to the downloads or release time of the emojis, and the user can select the favorite emoji after browsing the large quantity of emojis, the selection efficiency of the user is relatively low; and to perform the emoji recommendation based on the social relationship chain of the user and/or an emoji use situation of the user, so that a matching degree of the emoji recommended to the user with the user is relatively high, thereby improving the efficiency of adding the emoji by the user.

Figure 6:
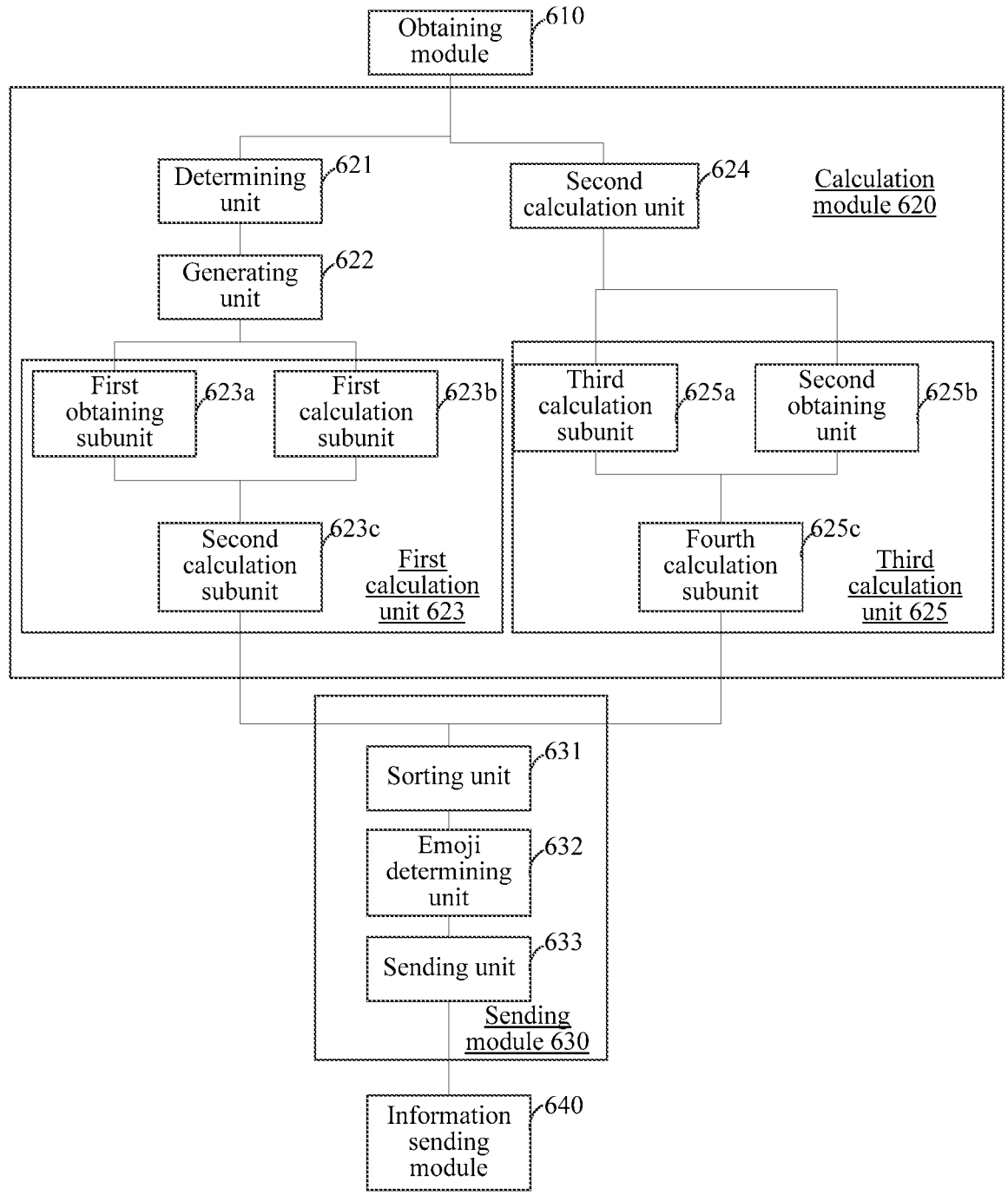
FIG. 6 is a structural block diagram of an emoji recommendation apparatus according to another embodiment of the presently disclosed technology.

Referring to FIG. 6, FIG. 6 is a structural block diagram of an emoji recommendation apparatus according to another embodiment of the presently disclosed technology. The emoji recommendation apparatus may be implemented, by means of hardware or a combination of hardware and software, as the entire or a part of the emoji recommendation server 120 in FIG. 1. The emoji recommendation apparatus includes:

an obtaining module 610, configured to obtain social behavior information of a user, the social behavior information including at least one of a social relationship chain of the user and emoji usage information of the user, the social relationship chain being used for indicating at least one associated user having a preset social relationship with the user, and the emoji usage information being used for indicating a usage behavior of the user to an emoji;

a calculation module 620, configured to calculate a correlation degree between the user and each emoji in an emoji library according to the social behavior information; and a sending module 630, configured to send a recommended emoji to a social networking application client corresponding to the user according to the correlation degree.

The social behavior information includes the social relationship chain of the user, and the calculation module 620 includes:

a determining unit 621, configured to determine the associated user having the preset social relationship with the user according to the social relationship chain of the user;

a generating unit 622, configured to generate a candidate emoji set according to emoji usage information corresponding to each associated user, where the candidate emoji set includes an emoji used by each associated user; and a first calculation unit 623, configured to calculate the correlation degree between the user and each emoji in the candidate emoji set.

The first calculation unit 623 includes:

a first obtaining subunit 623*a*, configured to obtain a social intimacy degree between the user and each associated user;

a first calculation subunit 623*b*, configured to calculate an emoji weight value of each associated user for each emoji in the candidate emoji set according to the emoji usage information corresponding to each associated user, where the emoji weight value is used for indicating a degree of using the emoji by the user; and a second calculation subunit 623*c*, configured to calculate the correlation degree between the user and each emoji in the candidate emoji set according to the social intimacy degree and the emoji weight value.

The second calculation subunit 623*c* is specifically configured to calculate the correlation degree between the user and each emoji in the candidate emoji set by substituting the social intimacy degree and the emoji weight value into a first correlation degree calculation formula, where the first correlation degree calculation formula is $$Score_{u,e} = \sum_{f}^{FriendOf(u)} \text{Weight}(u, f) * UserEmojiInteract(f, e),$$

where $Score_{u,e}$ represents the correlation degree between a user u and an emoji e in the candidate emoji set;

FriendOf(u) represents a set of associated users having the preset social relationship with the user u;

Weight(u, f) represents the social intimacy degree between the user u and an associated user f; and UserEmojiInteract(f, e) represents the emoji weight value of the associated user f for the emoji e.

The social behavior information includes the emoji usage information of the user, and the calculation module 620 includes:

a second calculation unit 624, configured to calculate an emoji similarity degree matrix corresponding to the emoji library, where the emoji similarity degree matrix includes an emoji similarity degree between each emoji in the emoji library; and a second calculation unit 625, configured to calculate the correlation degree between the user and each emoji in the emoji library according to the emoji usage information corresponding to the user and the emoji similarity degree matrix.

For an emoji α and an emoji β in the emoji library, an emoji similarity degree $M_{\alpha, \beta}$ between the emoji α and the emoji β is $$M_{\alpha,\beta} = \frac{1}{k_\alpha^{1-\lambda} k_\beta^\lambda} \sum_{j=1}^{u} \frac{a_{\alpha j} a_{\beta j}}{k_j},$$

where $k_\alpha$ represents the quantity of users sending the emoji α; $k_\beta$ represents the quantity of users sending the emoji β; u represents all users; $k_j$ represents the quantity of emojis sent by a user J ; $a_{\alpha j}$ indicates whether the user j sends the emoji α, and if the user j sends the emoji α, $a_{\alpha j}=1$ or if the user j does not send the emoji α, $a_{\alpha j}=0$; $a_{\beta j}$ indicates whether the user j sends the emoji β, and if the user j sends the emoji β, $a_{\beta j}=1$, or if the user j does not send the emoji β, $a_{\beta j}=0$; and λ is a floating point number, where 0<λ<1.

The third calculation unit 625 includes:

a third calculation subunit 625a, configured to calculate an emoji weight value of the user for a used emoji in the emoji library according to the emoji usage information corresponding to the user, where the emoji weight value is used for indicating a degree of using the emoji by the user;

a second obtaining subunit 625b, configured to obtain an emoji similarity degree between the used emoji and an unused emoji from the emoji similarity degree matrix, where the unused emoji is an emoji that is in the emoji library and that is not used by the user; and a fourth calculation subunit 625c, configured to calculate the correlation degree between the user and the unused emoji according to the emoji similarity degree between the used emoji and the unused emoji and the emoji weight value.

The fourth calculation subunit 625c is specifically configured to calculate the correlation degree between the user and the unused emoji by substituting the emoji similarity degree between the used emoji and the unused emoji and the emoji weight value into a second correlation degree calculation degree, where the second correlation degree calculation formula is $$Score_{u,e} = \sum_{se}^{SendEmojiList(u)} UserEmojiInteract(u, se) * M_{e,se},$$

where $Score_{u,e}$ represents the correlation degree between a user u and an unused emoji e;

SendEmojiList(u) represents a set of emojis used by the user u se represents a used emoji se;

UserEmojiInteract(u, se) represents the emoji weight value of the user u for the used emoji se; and $M_{e, se}$ represents the emoji similarity degree between the unused emoji e and the used emoji se.

The sending module 630 includes:

a sorting unit 631, configured to sort the emojis in a descending order according to the correlation degrees;

an emoji determining unit 632, configured to determine that the first n emojis after the sorting are the recommended emojis; and a sending unit 633, configured to send the recommended emojis to the social networking application client corresponding to the user, where the social networking application client is configured to display a download portal corresponding to the recommended emojis in an emoji panel.

The apparatus further includes:

an information sending module 640, configured to send corresponding recommendation information to the social networking application client corresponding to the user according to a calculation method of the correlation degree, where the social networking application client is configured to display the recommendation information when displaying a download portal corresponding to the recommended emojis in an emoji panel.

In conclusion, according to the emoji recommendation apparatus provided in this embodiment, the social behavior information of the user is obtained, the correlation degree between the user and each emoji in the emoji library is calculated according to the social relationship chain and/or the emoji usage information that are included in the social behavior information, and emoji recommendation is performed based on the correlation degree, to resolve a problem that because emojis are sorted according to the downloads or release time of the emojis, and the user can select the favorite emoji after browsing the large quantity of emojis, the selection efficiency of the user is relatively low; and to perform the emoji recommendation based on the social relationship chain of the user and/or an emoji use situation of the user, so that a matching degree of the emoji recommended to the user with the user is relatively high, thereby improving the efficiency of adding the emoji by the user.

In this embodiment, the emoji recommendation server determines the associated user having the preset social relationship with the user by using the social relationship chain of the user, and performs the emoji recommendation according to emoji usage of each associated user, so that the emoji recommended to the user more meets an emoji preference of the user. Meanwhile, compared with displaying a large quantity of emojis in the emoji shop, directly displaying the emoji recommended by the emoji recommendation server to the user in the emoji panel is more intuitive, and facilitates the user rapidly downloading the emoji, thereby improving the efficiency of downloading the emoji by the user.

In this embodiment, when calculating the correlation degree between the user and the emoji, the emoji recommendation server integrates the social intimacy degree between the user and the associated user and the emoji weight value of the associated user for the emoji, thereby ensuring the accuracy of the correlation degree that is obtained by means of calculation, and increasing the matching degree of the recommended emoji with the user preference.

In this embodiment, the emoji recommendation server selects, according to emoji usage of the user and the similarity degree between each emoji in the emoji library, another emoji having a relatively high emoji similarity degree with the emoji that is frequently used by the user from the emoji library, and recommends the emoji to the user by using the emoji as the recommended emoji, so that the emoji recommended to the user is similar to an emoji preferred by the user, thereby increasing the accuracy of the emoji recommendation.

Figure 7:
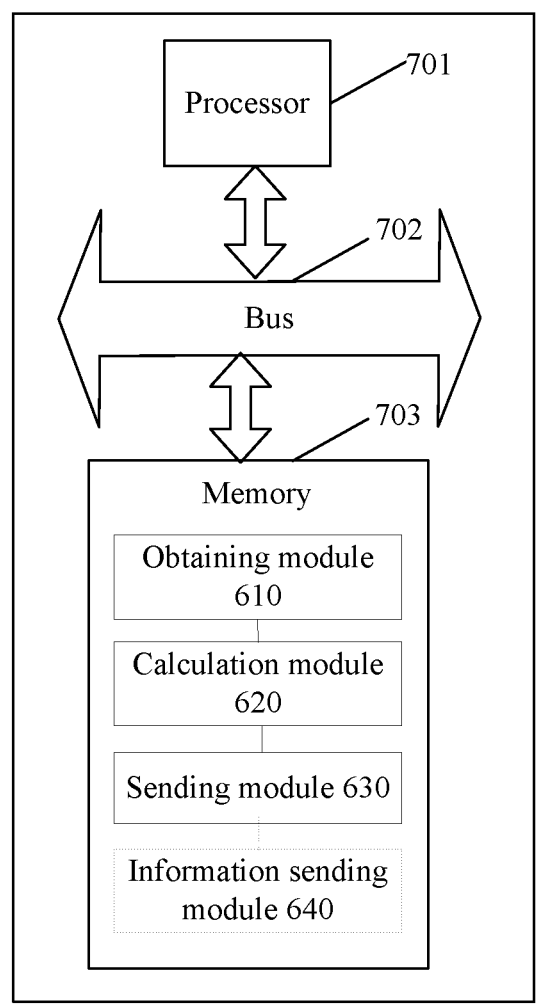
FIG. 7 is a schematic diagram of a hardware structure of an emoji recommendation apparatus according to another embodiment of the presently disclosed technology.

Referring to FIG. 7, FIG. 7 is a schematic diagram of a hardware structure of an emoji recommendation apparatus according to another embodiment of the presently disclosed technology. The apparatus may include a processor 701, a bus 702, and a memory 703. The processor 701 and the memory 703 are interconnected by using the bus 702.

The memory 703 stores an obtaining module 610, a calculation module 620, and a sending module 630.

The memory 703 may further store an information sending module 640.

When being performed by the processor 701, operations performed by the modules stored in the memory 703 are the same as those in the foregoing embodiment, and details are not described herein again. It should be noted that, the emoji recommendation apparatus provided in the foregoing embodiment is described only through an example of division of the functional modules. In an actual application, the foregoing functions may be assigned according to needs to be implemented by different functional modules, that is, the internal structure of the emoji recommendation server is divided into different functional modules, so as to implement all or a part of the functions described above. In addition, the emoji recommendation apparatus provided in the foregoing embodiment and the embodiments of the emoji recommendation method belong to a same concept. For a specific implementation process of the apparatus, refer to the method embodiments, and details are not described herein again.

It should be understood that, unless an exception is clearly specified in the context, the singular form ("a", "an", and "the") used herein is intended to include the plural form. It should be further understood that, "and/or" used herein includes any or all possible combinations of one or more items that are listed in an associated manner.

The sequence numbers of the preceding embodiments of the presently disclosed technology are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the presently disclosed technology, but are not intended to limit the presently disclosed technology. Any modification, equivalent replacement, or improvement made within the spirit and principle of the presently disclosed technology shall fall within the protection scope of the presently disclosed technology.

What is claimed is:

1. An emoji recommendation method, including:

at a social networking client device having one or more processors and memory:

displaying a first user interface of a social network client application, wherein the social network client application is configured to communicate with a social network server providing a social networking platform, and wherein the social network client application corresponds to a first user of the social networking platform;

while displaying the first user interface of the social network client application, detecting occurrence of a trigger event that corresponds to a preset condition for triggering delivery of an emoji recommendation from the social network server to the first user, further including:

while displaying a chat session between the first user and at least a second user in the first user interface, detecting receipt of a message from the second user that includes at least one emoji that the first user has not downloaded for the first user's own use before; and in accordance with detecting the receipt of the message from the second user that includes at least one emoji that the first user has not downloaded for the first user's own use before, sending a request to the social network server for an emoji recommendation to be downloaded by the first user based at least in part on the message including the at least one emoji;

in response to detecting the occurrence of the trigger event, retrieving one or more emoji recommendations from the social network server, wherein the one or more emoji recommendations are selected from an emoji library for the first user in accordance with the request including the message including the at least one emoji and social behavior information of the first user, including one or more social relationship chains of the first user on the social networking platform and emoji usage information of the first user on the social networking platform, the social relationship chains being used for indicating one or more associated users having respective preset social relationships with the first user on the social networking platform, and the emoji usage information being used for indicating respective usage behavior of the first user to one or more emojis; and displaying the one or more emoji recommendations on the first user interface, including displaying one or more editing controls to adjust one or more parameters for calculating a correlation degree of the first user and a respective emoji based on one or more attributes of the one or more emoji recommendations retrieved from the social network server, wherein the recommended emojis and other previously downloaded emojis are displayed using different display effects;

wherein detecting occurrence of a trigger event that corresponds to a preset condition for triggering delivery of an emoji recommendation from the social network server to the first user includes:

while displaying a listing of currently downloaded emojis, detecting that there are less than a preset amount of emojis in the listing of currently downloaded emojis; and in accordance with detecting that there are less than a preset amount of emojis in the listing of currently downloaded emojis, sending a request to the social network server for an emoji recommendation.

2. The method of claim 1, wherein displaying the one or more editing controls to adjust one or more parameters for calculating a correlation degree of the first user and a respective emoji based on one or more attributes of the one or more emoji recommendations retrieved from the social network server includes:
 identifying one or more relationship chains between the first user and one or more associated users of the first user that have been used to determine the correlation degree of the first user and the respective emoji; and
 providing one or more controls to reduce or eliminate an effect of selected ones of the one or more relationship chains in the calculation of correlation degrees between the first user and respective emojis for future emoji recommendations by the social network server.

3. The method of claim 2, including:
 receiving a first user input invoking the one or more controls to reduce or eliminate an effect of a first relationship chain of the one or more relationship chains in the calculation of correlation degrees between the first user and respective emojis for future emoji recommendations by the social network server; and
 in response to receiving the first user input, sending an indicator of the first relationship chain to the social network server, wherein the social network server removes or reduce the effect of the first relationship chain in the calculation of correlation degrees between the first user and respective emojis for future emoji recommendations for the first user.

4. The method of claim 3, wherein the social network server reduces the effect of the first relationship chain by reducing a respective social intimacy degree between the first user and a respective user corresponding to the first relationship chain.

5. The method of claim 1, wherein displaying the one or more editing controls to adjust one or more parameters for calculating a correlation degree of the first user and a respective emoji based on one or more attributes of the one or more emoji recommendations retrieved from the social network server includes:
 identifying one or more related emojis from the first user's emoji usage history that have been used to determine the correlation degree of the first user and the respective emoji; and
 providing one or more controls to reduce or eliminate an effect of selected ones of the one or more related emojis in the calculation of correlation degrees between the first user and respective emojis for future emoji recommendations by the social network server.

6. The method of claim 1, wherein displaying the one or more editing controls to adjust one or more parameters for calculating a correlation degree of the first user and a respective emoji based on one or more attributes of the one or more emoji recommendations retrieved from the social network server includes:
 identifying one or more related emojis from the first user's emoji usage history that have been used to determine the correlation degree of the first user and the respective emoji; and
 providing one or more controls to reduce or eliminate an effect of selected ones of the one or more related emojis in the calculation of correlation degrees between the first user and respective emojis for future emoji recommendations by the social network server.

7. A social networking client device, comprising:
 one or more processors; and
 memory storing instructions, the instructions when executed by the one or more processors, cause the processors to perform operations comprising:
 displaying a first user interface of a social network client application, wherein the social network client application is configured to communicate with a social network server providing a social networking platform, and wherein the social network client application corresponds to a first user of the social networking platform;
 while displaying the first user interface of the social network client application, detecting occurrence of a trigger event that corresponds to a preset condition for triggering delivery of an emoji recommendation from the social network server to the first user, further including:
  while displaying a chat session between the first user and at least a second user in the first user interface, detecting receipt of a message from the second user that includes at least one emoji that the first user has not downloaded for the first user's own use before; and
  in accordance with detecting the receipt of the message from the second user that includes at least one emoji that the first user has not downloaded for the first user's own use before, sending a request to the social network server for an emoji recommendation to be downloaded by the first user based at least in part on the message including the at least one emoji;
 in response to detecting the occurrence of the trigger event, retrieving one or more emoji recommendations from the social network server, wherein the one or more emoji recommendations are selected from an emoji library for the first user in accordance with the request including the message including the at least one emoji and social behavior information of the first user, including one or more social relationship chains of the first user on the social networking platform and emoji usage information of the first user on the social networking platform, the social relationship chains being used for indicating one or more associated users having respective preset social relationships with the first user on the social networking platform, and the emoji usage information being used for indicating respective usage behavior of the first user to one or more emojis; and
 displaying the one or more emoji recommendations on the first user interface, including displaying one or more editing controls to adjust one or more parameters for calculating a correlation degree of the first user and a respective emoji based on one or more attributes of the one or more emoji recommendations retrieved from the social network server, wherein the recommended emojis and other previously downloaded emojis are displayed using different display effects;
 wherein detecting occurrence of a trigger event that corresponds to a preset condition for triggering delivery of an emoji recommendation from the social network server to the first user includes:
  while displaying a listing of currently downloaded emojis, detecting that there are less than a preset amount of emojis in the listing of currently downloaded emojis; and
  in accordance with detecting that there are less than a preset amount of emojis in the listing of currently downloaded emojis, sending a request to the social network server for an emoji recommendation.

8. The device of claim 7, wherein displaying the one or more editing controls to adjust one or more parameters for calculating a correlation degree of the first user and a respective emoji based on one or more attributes of the one or more emoji recommendations retrieved from the social network server includes:
identifying one or more relationship chains between the first user and one or more associated users of the first user that have been used to determine the correlation degree of the first user and the respective emoji; and
providing one or more controls to reduce or eliminate an effect of selected ones of the one or more relationship chains in the calculation of correlation degrees between the first user and respective emojis for future emoji recommendations by the social network server.

9. The device of claim 8, wherein the operations include:
receiving a first user input invoking the one or more controls to reduce or eliminate an effect of a first relationship chain of the one or more relationship chains in the calculation of correlation degrees between the first user and respective emojis for future emoji recommendations by the social network server; and
in response to receiving the first user input, sending an indicator of the first relationship chain to the social network server, wherein the social network server removes or reduce the effect of the first relationship chain in the calculation of correlation degrees between the first user and respective emojis for future emoji recommendations for the first user.

10. The device of claim 9, wherein the social network server reduces the effect of the first relationship chain by reducing a respective social intimacy degree between the first user and a respective user corresponding to the first relationship chain.

11. A non-transitory computer-readable storage medium storing instructions, the instructions when executed by one or more processors, cause the processors to perform operations comprising:
displaying a first user interface of a social network client application, wherein the social network client application is configured to communicate with a social network server providing a social networking platform, and wherein the social network client application corresponds to a first user of the social networking platform;
while displaying the first user interface of the social network client application, detecting occurrence of a trigger event that corresponds to a preset condition for triggering delivery of an emoji recommendation from the social network server to the first user, further including:
while displaying a chat session between the first user and at least a second user in the first user interface, detecting receipt of a message from the second user that includes at least one emoji that the first user has not downloaded for the first user's own use before; and
in accordance with detecting the receipt of the message from the second user that includes at least one emoji that the first user has not downloaded for the first user's own use before, sending a request to the social network server for an emoji recommendation to be downloaded by the first user based at least in part on the message including the at least one emoji;
in response to detecting the occurrence of the trigger event, retrieving one or more emoji recommendations from the social network server, wherein the one or more emoji recommendations are selected from an emoji library for the first user in accordance with the request including the message including the at least one emoji and social behavior information of the first user, including one or more social relationship chains of the first user on the social networking platform and emoji usage information of the first user on the social networking platform, the social relationship chains being used for indicating one or more associated users having respective preset social relationships with the first user on the social networking platform, and the emoji usage information being used for indicating respective usage behavior of the first user to one or more emojis; and
displaying the one or more emoji recommendations on the first user interface, including displaying one or more editing controls to adjust one or more parameters for calculating a correlation degree of the first user and a respective emoji based on one or more attributes of the one or more emoji recommendations retrieved from the social network server, wherein the recommended emojis and other previously downloaded emojis are displayed using different display effects;
wherein detecting occurrence of a trigger event that corresponds to a preset condition for triggering delivery of an emoji recommendation from the social network server to the first user includes:
while displaying a listing of currently downloaded emojis, detecting that there are less than a preset amount of emojis in the listing of currently downloaded emojis; and
in accordance with detecting that there are less than a preset amount of emojis in the listing of currently downloaded emojis, sending a request to the social network server for an emoji recommendation.

12. The computer-readable storage medium of claim 11, wherein displaying the one or more editing controls to adjust one or more parameters for calculating a correlation degree of the first user and a respective emoji based on one or more attributes of the one or more emoji recommendations retrieved from the social network server includes:
identifying one or more relationship chains between the first user and one or more associated users of the first user that have been used to determine the correlation degree of the first user and the respective emoji; and
providing one or more controls to reduce or eliminate an effect of selected ones of the one or more relationship chains in the calculation of correlation degrees between the first user and respective emojis for future emoji recommendations by the social network server.

13. The computer-readable storage medium of claim 12, wherein the operations include:
receiving a first user input invoking the one or more controls to reduce or eliminate an effect of a first relationship chain of the one or more relationship chains in the calculation of correlation degrees between the first user and respective emojis for future emoji recommendations by the social network server; and
in response to receiving the first user input, sending an indicator of the first relationship chain to the social network server, wherein the social network server removes or reduce the effect of the first relationship chain in the calculation of correlation degrees between the first user and respective emojis for future emoji recommendations for the first user.

14. The computer-readable storage medium of claim 13, wherein the social network server reduces the effect of the first relationship chain by reducing a respective social intimacy degree between the first user and a respective user corresponding to the first relationship chain.

* * * * *